Aug. 5, 1969   O. E. RITTENBACH   3,460,139
COMMUNICATION BY RADAR BEAMS
Filed Sept. 6, 1967   4 Sheets-Sheet 3
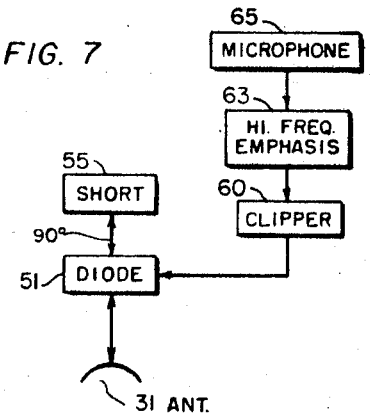
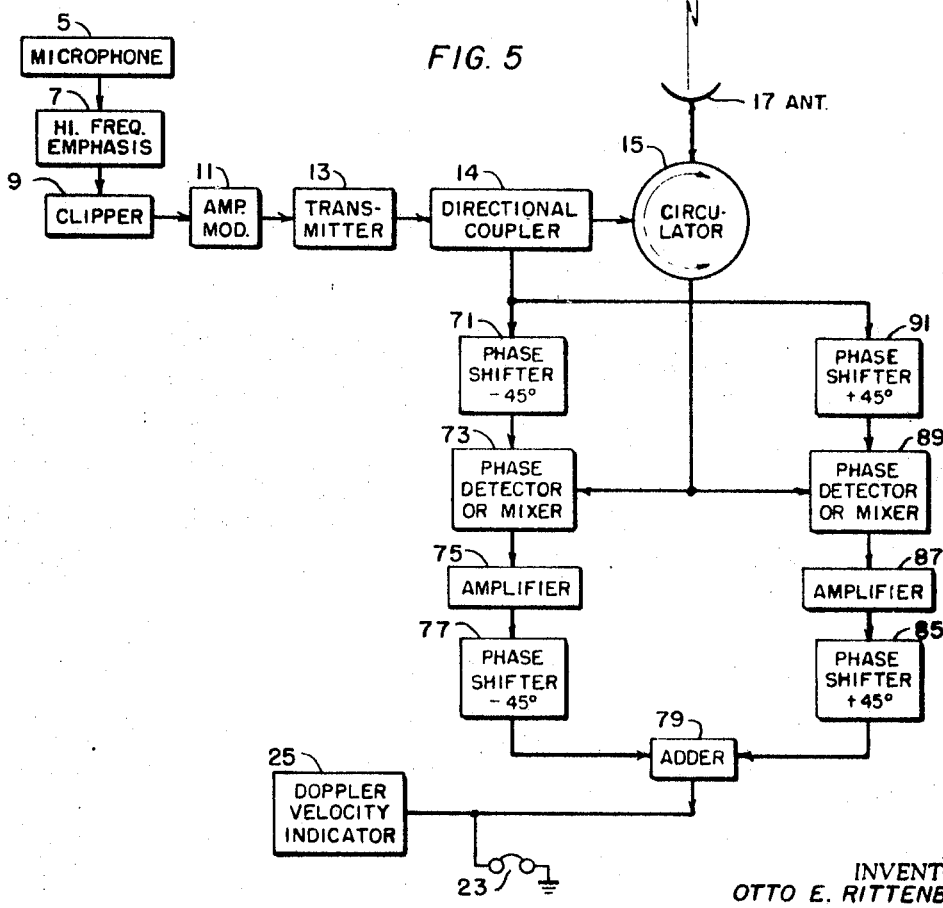
INVENTOR,
OTTO E. RITTENBACH.

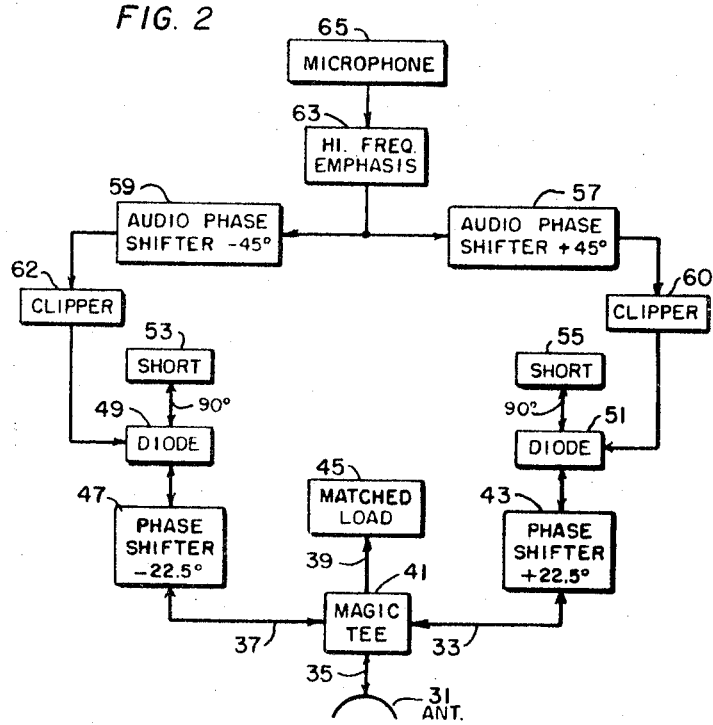
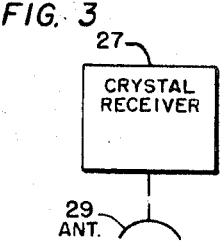
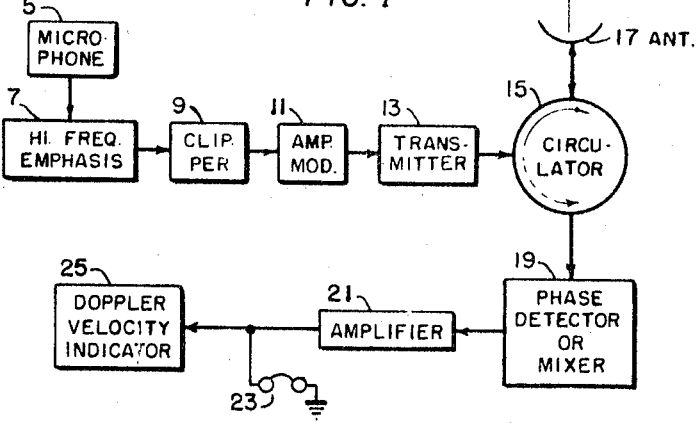

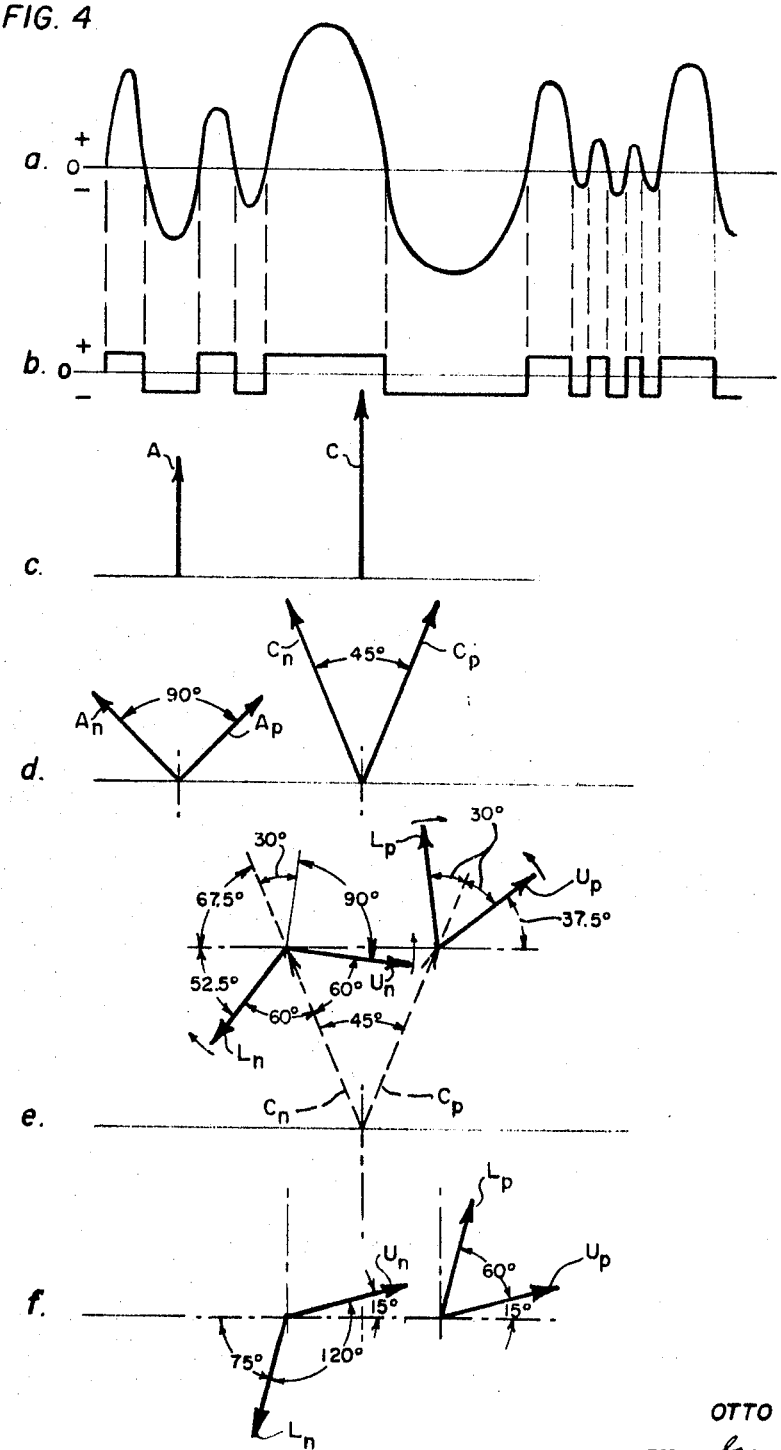

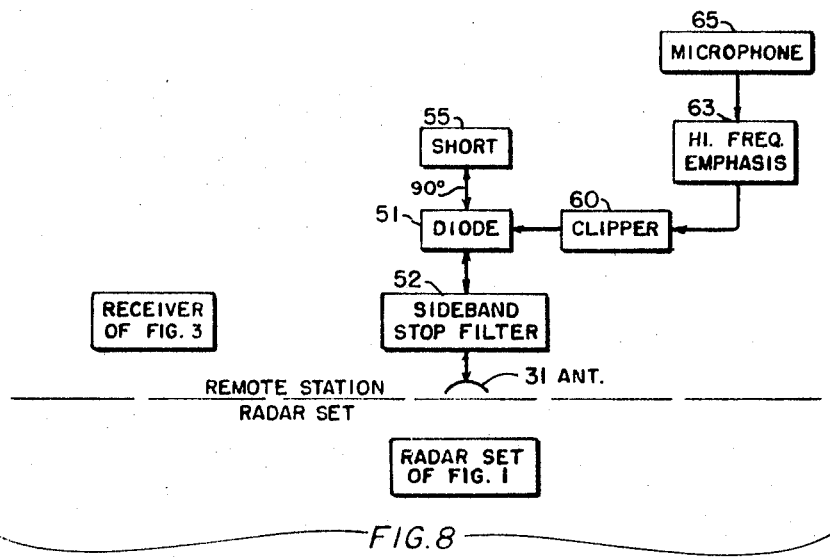
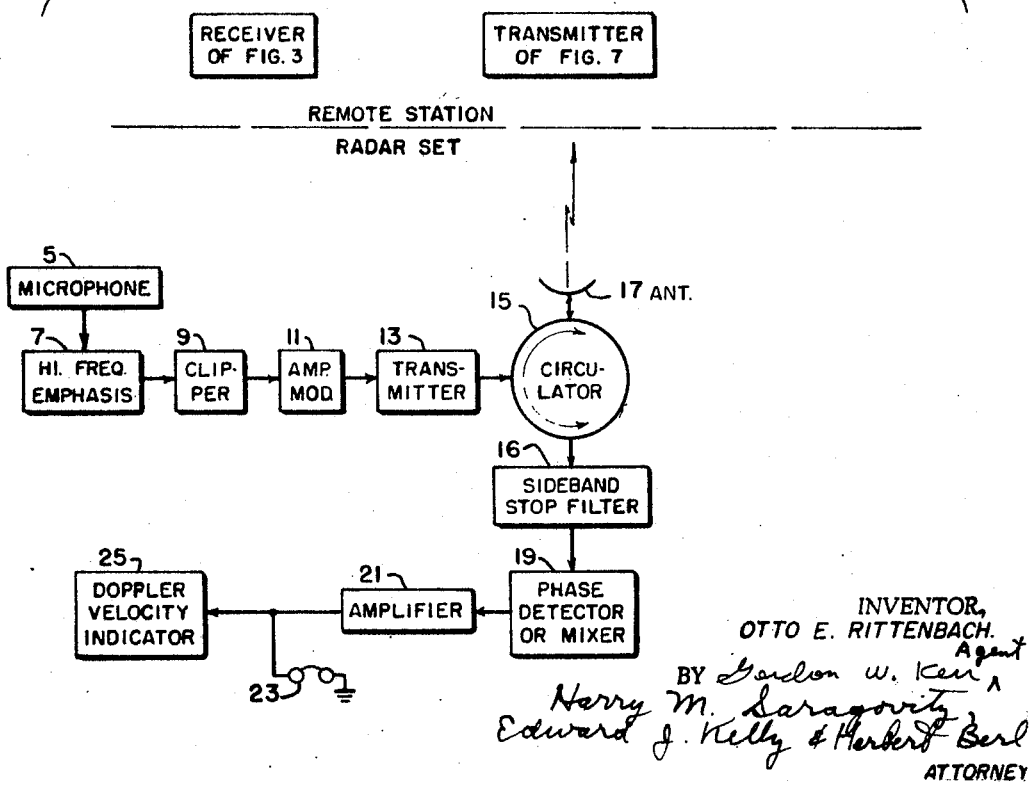

United States Patent Office 3,460,139
Patented Aug. 5, 1969

3,460,139
COMMUNICATION BY RADAR BEAMS
Otto E. Rittenbach, Neptune, N.J., assignor to the United States of America as represented by the Secretary of the Army
Filed Sept. 6, 1967, Ser. No. 666,559
Int. Cl. G01s 9/00
U.S. Cl. 343—6            6 Claims

ABSTRACT OF THE DISCLOSURE

Several systems are shown for communicating via the beams of Doppler radar sets. In each embodiment the outgoing radar beam is modulated with a voice or other intelligence signal and a remote station is adapted to demodulate this signal. Each remote station also includes a transmitter for reflecting the radar beam back toward the radar set with intelligence originating at the remote station impressed thereon. In order to provide a fade-free link, single sideband modulation at the remote transmitter, or single sideband demodulation at the radar set is provided. Also, high frequency emphasis plus clipping of the voice signals at both ends of the system increase the useful range.

---

The invention described herein may be manufactured, used, and licensed by or for the Government for governmental purposes without the payment to me of any royalty thereon.

The present invention relates to circuitry by means of which communication may be carried on over a radar beam. The technique involves modulating the radar transmitter with the intelligence to be conveyed to a remote station within the range of the radar set. The remote station may comprise a simple lightweight receiver adapted to pick up and demodulate the intelligence on the radar beam and also a passive or active transmitter which is adapted to reflect the incident radar beam back toward the radar set with intelligence originating at the remote station impressed thereon. Communication by radar beams has been known for some time, for example, IFF systems in which a radar set interrogates a remote station is a form of communication via radar beams. The communication system of the present invention is particularly adapted for use with Doppler radar sets of the type used to detect moving targets. In this type of radar, the echo signal is detected by comparing its phase either with that of the radar transmitter, with the phase of a coho oscillator which is phase locked to the radar transmitter, or to the phase of echo signal clutter from stationary targets in the vicinity of the moving target of interest. If conventional double sideband amplitude modulation is used for communication with Doppler radar sets of any of these types, the output of the voice or intelligence demodulator at the radar set will vary with the distance between the radar set and the remote station. The reason for this is that the Doppler detector thereof, which is essentially a phase detector, has a varying sensitivity to double sideband modulated signals, the sensitivity varying with the phase of the incoming modulated echo signal. The echo phase is determined by the number of carrier frequency wavelengths between the radar set and the remote station. Thus as the remote station changes its range from the radar set, the communication channel from the remote station to the radar would fade in and out as the remote station traverses each quarter wavelength of the radar carrier. The present invention eliminates this fading by the use of single sideband modulation. The use of such modulation in the link from the remote station to the radar set results in constant and maximum detection sensitivity at the radar set regardless of the range of the remote station. In order to accomplish this, the remote station may be provided with a single sideband modulator, or alternatively, the remote station may be provided with a double sideband amplitude modulator and the demodulator at the radar set can be arranged to respond only to one of the sidebands received from the remote station. In order to extend the range and increase the signal-to-noise ratio of the communications link, speech signals at both ends of the system are clipped, after the high frequencies thereof have been emphasized. This removes the amplitude variations from the speech signals, leaving only the zero-crossings thereof and permits a maximum percentage modulation of the radar wave at all times regardless of the voice signal amplitude.

It is thus an object of the invention to provide a radar system with a long range, fade-free communications link.

Another object of the invention is to provide a fade-free communications capability for Doppler radar sets of both the coherent and non-coherent types.

These and other objects and advantages of the present invention will become apparent from the following detailed description and drawings, in which:

FIGURES 1, 2 and 3 are block diagrams of one embodiment of a radar beam communication system comprising the coherent Doppler radar set of FIGURE 1 and a single remote station comprising FIGURES 2 and 3.

FIGURE 4 illustrates waveforms in parts of the circuitry of the preceding figures.

FIGURES 5, 6 and 7 are an alternate embodiment of the system of FIGURES 1, 2 and 3.

FIGURE 8 is a modification of the system of FIGURES 1, 2 and 3 and

FIGURE 9 is a modification of the system of FIGURES 5, 6 and 7.

The system of FIGURES 1, 2 and 3 is one in which a simple continuous wave Doppler radar of the zero intermediate frequency type has its transmitter double-sideband amplitude modulated by a voice signal. This simple type of coherent Doppler radar has been illustrated to simplify the drawing, but any type of Doppler radar, either pulsed or continuous wave, coherent or noncoherent, may be utilized in the practice of this invention. If a pulsed radar set is used, the pulse repetition frequency must be at least twice that of the voice bandwidth to be transmitted, and the transmission is by some form of pulse modulation. In the illustrated system each remote station is provided with a simple, conventional crystal receiver 27 by means of which the modulation on the radar beam is received and demodulated. Since the receiver 27 does not utilize coherent detection and the received signal is of relatively high level, no problems are involved in demodulating the incoming radar beam. The transmitter of the remote station is shown in FIGURE 2. After a message has been received by 27 the radar set of FIGURE 1 will no longer be modulated by voice signals and the transmitter of FIGURE 2 is adapted to pick up the energy of the radar beam, single-sideband modulated it with a voice or other signal, and retransmit this single sideband signal back toward the radar set of FIGURE 1. The remote station transmitter comprises a microwave antenna 31 which is connected to the shunt or parallel arm 35 of magic T 41. The two collinear or side arms 33 and 37 are connected to microwave phase shifters 43 and 47, respectively. The phase shifter 47 shifts the phase by minus 22.5° and the other phase shifter 43 by plus 22.5°. A matched absorbing load 45 is connected to the series arm 39 of the magic T. The phase shifter 43 has a diode 51 and a short circuit 55 connected in cascade therewith and similar elements 49 and 53 are connected to phase shifter 47. All of the elements of FIGURE 2 described thus far are microwave elements and would be interconnected by appropriate microwave "plumbing" such as waveguides, however the waveguides have not been pictorially illustrated to simplify the drawing. Both of the diodes would be shunted across the center of a waveguide which is connected at one end to the microwave phase shifter and the short circuits 53 and 55 would comprise the closed end of the waveguides in which the diodes are mounted. Both diodes are mounted 90 electrical degrees, or one quarter wavelength, from the shorted end of their respective waveguides. FIGURE 2 further comprises a microphone 65 and a high frequency emphasis circuit 63 in cascade. The audio signal from the microphone has its high frequencies raised in amplitude relative to the middle and low frequencies in circuit 63. The output of circuit 63 is applied in parallel to the two audio phase shifters 57 and 59 which impart fixed phase shifts of plus 45° and minus 45°, respectively, to the audio signal. The outputs of the audio phase shifters are then clipped in clipper circuits 60 and 62 to substantially eliminate the amplitude variations thereof, leaving essentially only the zero-crossings of the two audio signals. The waveform of FIGURE 4a is a typical voice waveform as it would appear at the output of one of the audio phase shifters and waveform 4b shows the same signal after being clipped. The voice waveforms at the outputs of the other audio phase shifter and clipper would differ in shape from those illustrated because of the 90° phase difference between the audio signals at the phase shifter outputs. The output of clipper 62 is applied to diode 49 and that of clipper 60 to diode 51. The clipped signals have only two levels, as seen in FIGURE 4b. One of these levels is arranged to bias the diode into conductivity and thus reflect from the diodes the incoming microwave energy from the microwave phase shifters. The other level of the audio signal is arranged to back bias the diodes, in which case the incoming energy passes the diodes and is reflected from the short circuits, 90 electrical degrees away. Thus the outgoing or reflected energy, as it enters the microwave phase shifters will comprise a signal which reverses phase, or changes phase by 180°, with each zero-crossing or change in level of the audio signal applied to the diode of its channel. This follows from the fact that the round trip phase shift from each diode to its short circuit is 180°. Thus if a diode is conducting, indicating one level of the clipped audio signal, the signal reflected from the diode will have a certain phase. When the clipped audio signal changes its level, the outgoing or reflected signal at the microwave phase shifter will change by 180°, since the signal must traverse an additional roundtrip electrical length of 180° when it is reflected from the short circuited waveguides. A signal of this type which reverses phase at the frequency of the modulating waveform is a characteristic of an amplitude modulated signal with the carrier removed. Thus each diode and short circuit is the equivalent of a balanced modulator which produces a pair of sidebands with no carrier. The reflected signal in both channels passes through both microwave phase shifters 47 and 43, and thence to the collinear arms 37 and 33, respectively, of the magic T. As each signal enters the magic T in the outgoing direction it comprises upper and lower sidebands, but no carrier, as explained above. The phase relations of the reflected signals entering the collinear arms of the magic T are such that the lower sidebands entering the arm 37 are equal in amplitude and oppositely phased from the lower sidebands entering the other collinear arm 33 and the upper sidebands are equal in amplitude but with the same phase. The result is that the lower sidebands cancel each other and the upper sidebands add to form a single sideband signal. This single sideband signal then divides equally between the matched load 45 and the antenna 31. The portion of the reflected signal which reaches antenna 31 is radiated to the radar antenna 17 and is demodulated by the receiving circuitry thereof.

The vector diagrams of FIGURE 4c through f illustrate the mode of operation of the transmitter of FIGURE 2. The signals in these diagrams are represented as vectors, the direction of which represents the phase of the signals. Amplitude modulated waves are represented by three vectors, a carrier vector with the sidebands represented as vectors at the top of the carrier vector and rotating in opposite directions. This representation of amplitude modulated signals is conventional, as shown in "Radio Engineering" by Terman, third edition, at page 491. In FIGURE 4c, the vector A represents the voice signal output of the microphone 65 and the vector C represents the incoming radar beam within the magic T 41. In FIGURE 4d the vector $A_p$ represents the output of the phase shifter 57. It is seen that this vector $A_p$ is the microphone output A with a positive phase shift of 45° due to phase shifter 57. Similarly the vector $A_n$ represents the negatively phase shifted output of phase shifter 59. The subscript p, for positive, is applied to the vectors in the right hand or positive channel for FIGURE 2 where the phase shifts are positive and the subscript n, for negative, to the vectors of the left hand or negative channel where the phase shifts are negative. Thus the audio modulating voltages $A_n$ and $A_p$, applied to the two diodes 60 and 62 differ in phase by 90°. The vector $C_p$ of 4d represents the incoming microwave signal at the output of the microwave phase shifter 43 of the positive channel, and the vector $C_n$ the signal at the corresponding point of the negative channel. Thus the microwave signals applied to the two diodes differ in phase by 45° As stated above, the outgoing reflected signals in each channel comprise upper and lower sidebands with the carrier removed. The phases of these sidebands are determined conjointly by the phase of the incoming microwave signal and the phase of the audio modulating voltages. FIGURE 4e illustrates the phase of the sidebands in each channel as they enter the two microwave phase shifters in the outgoing direction. In 4e, the two microwave carriers are shown as dashed vectors, $C_n$ and $C_p$, since they are not present in the signal, but their phases determine the phases of the sidebands. The two counter-rotating vectors $L_p$ and $U_p$ are the lower and upper sidebands, respectively, of the positive channel and are shown arbitrarily at an angle of 30° with the missing carrier $C_p$. The sidebands rotate in the direction of the curved arrows. At the same instant that the sidebands of the positive channel are at the position shown, the sidebands of the negative channel, $L_n$ and $U_n$, will lag, relative to their missing carrier $C_n$, by 90° compared to the sidebands of the positive channel, due to the 90° phase difference in the modulating voltages. FIGURE 4f shows the phase relations of the sidebands as they enter the collinear arms of the magic T. The sidebands $L_p$ and $U_p$ are rotated 22.5° clockwise due to the positive phase shift of the phase shifter 43 and $L_n$ and $U_n$ are rotated by the same angle but in the opposite direction, due to the negative phase shift of phase shifter 47. It can be seen that $L_n$ and $L_p$ are now oppositely phased and will therefore cancel in the magic T, whereas $U_n$ and $U_p$ are in phase and will therefore add to form a single upper sideband of double amplitude.

The circuitry of the radar set of FIGURE 1 includes an antenna 17, a circulator 15, a continuous wave transmitter 13, a phase detector (or mixer) 19 a Doppler frequency amplifier 21 and an indicator 25. The circuitry described thus far is a conventional Doppler CW radar of the zero-intermediate-frequency type in which the echo signal is coherently detected in phase detector 19, using the portion of the transmitter output which leaks around the circulator in the counter-clockwise direction as a phase reference. When the radar set is being used for moving target detection, the output of the phase detector will be a Doppler signal with a frequency proportional to the radial target velocity. This signal is amplified by 21 and applied to Doppler indicator 25, which may comprise a frequency meter. When the radar set is receiving the single sideband signal from the transmitter of FIGURE 2, the detection process is the same but the output of the phase detector 19 will now comprise the demodulated audio signal. This signal, as well as any Doppler signals, can be monitored by means of headphones 23. When receiving the single sideband communication signal, the transmitter leakage to the phase detector 19 supplies the missing carrier which makes possible the demodulation of the received signal. The means for modulating the radar beam of the radar set comprises the microphone 5, the high frequency emphasis circuit 7, the clipper 9 and the amplitude modulator 11. The first three of these cascaded elements serve the same purpose as the same elements of FIGURE 2. The amplitude modulator 11 varies the amplitude of the transmitter 13 in accordance with the audio signal to produce double-sideband amplitude modulation by conventional means.

Although the receiver 27 of FIGURE 3 and the transmitter of FIGURE 2 have been shown separately, in practice the receiver 27 may be connected to magic T arm 39 in place of the matched load 45, to form a single unit.

In the embodiment of FIGURES 5, 6 and 7, the transmitter (FIGURE 7) of the remote station reflects the incoming radar beam with double sideband modulation with no carrier and the receiving circuitry at the radar set is adapted to respond only to one of the sidebands received from the remote station, thus providing a fade-free link. The crystal receiver 27 of the remote station is the same as that of the previously described embodiment of FIGURE 3. The transmitter of FIGURE 7 comprises an antenna 31, diode 51, short circuit 55, microphone 65, high frequency emphasis circuit 63 and clipper 60. These elements serve the same function as the correspondingly numbered elements of FIGURE 2. The energy reflected toward the antenna 31 by the short circuit or the diode 51 will comprise upper and lower sidebands with the carrier suppressed, as was explained in connection with FIGURE 2. The transmitting portion of the radar set of FIGURE 5 is similar to that of FIGURE 1 and comprises microphone 5, high frequency emphasis circuit 7, clipper 9, amplitude modulator 11, transmitter 13, directional coupler 14, circulator 15 and antenna 17. This circuitry provides conventional amplitude modulation of the outgoing radar beam when the radar set is being used for communication. The rest of the circuitry comprises the receiving portion of the radar set. The incoming double sideband signal from the remote transmitter travels around the circulator 15 in the clockwise direction and is applied in parallel to a pair of phase detectors 73 and 89. The coherent reference inputs to these two phase detectors comprises a portion of the output of transmitter 13 which is obtained by means of the directional coupler 14. The reference input of the phase detector 73 is shifted in phase by minus 45° in microwave phase shifter 71 and that of the other phase detector by plus 45° in microwave phase shifter 91. Thus the two reference inputs differ in phase by 90°. The two phase detector outputs are amplified by elements 75 and 87. The phase detector outputs are audio or voice signals when the radar set is being used for communication and are Doppler signals when being used as a Doppler radar. The output of amplifier 75 is phase shifted by minus 45° in phase shifter 77 and that of amplifier 87 by plus 45° in phase shifter 85. The outputs of these two phase shifters 77 and 85 comprise signals which are 90° out of phase and which may have different amplitudes depending on the range or distance of the remote station from the radar set. The two signals are combined in adder 79 to yield a signal with an amplitude equal to the vector sum of the adder inputs. The adder output is applied in parallel to the headphones 23 and Doppler velocity indicator 25 which serve the same function as the same elements of FIGURE 1. It can be shown that this receiving circuitry responds only to the upper sideband of the incoming signal. The detection process is one of re-inserting the missing carrier to the incoming double sideband signal, the directional coupler providing the missing carrier. If only a single channel or phase detector were used, the proper phase of the re-inserted carrier for maximum sensitivity would vary depending on the distance of the remote station. With two receiving phase detectors, and with the re-inserted carrier at each phase detector differing in phase by 90°, the signal amplitude output from each phase detector will fade in and out alternately, that is, as the output of one phase detector goes up, the other will go down, and vice versa, as the incoming signal changes phase. However, the sum of the two detected signals will remain sensibly constant. If the phase shifters 77 and 85 are interchanged, the lower sideband will be detected instead of the upper.

Instead of producing or receiving a single sideband by the electronic means already described, the same result can be achieved by filtering out one of the sidebands, either at the remote transmitter or in the receiving circuitry of the radar set. This means of achieving the desired result appears to result in simpler circuitry, however in practice it may not be as easy to instrument as the previously-described embodiments because of drift in the radar transmitter frequency which causes the sidebands to drift by the same amount.

FIGURE 8 shows a system wherein a remote transmitter similar to that of FIGURE 7 is used but with a band stop filter, 52, inserted between the antenna and the diode. This filter is tuned to block one of the sidebands reflected by the diode 51 and short 55, with the result that only the other sideband is reflected back toward the radar set. Thus the radar set of FIGURE 1 may be used with this system. The filter 52 will not interfere with the incoming radar carrier frequency, since this frequency is outside of the stop band of the filter. In the embodiment of FIGURE 9, the remote transmitter of FIGURE 7 is used, which produces a double sideband signal, and one of the received sidebands is filtered out in the receiving circuitry of the radar set. The band stop filter 16, tuned to one of the sidebands, accomplishes this purpose. The radar set of FIGURE 9 is the same as that of FIGURE 1 except for the addition of the filter 16 between the circulator 15 and the phase detector 19.

Obvious modifications can be made to the circuitry illustrated. For example, in FIGURES 2 and 5 phase shifters have been shown in both channels, however in practice, the same result could be obtained by using phase shifters in only one channel of each figure, these phase shifters having double the amount of phase shift. Also, while positive and negative phase shifts are referred to, the same result could be obtained if the phase shifters of opposite channels had phase shifts of the same sense, but differing in magnitude by the required amount. For example, the phase shifter 59 of FIGURE 2 could have a positive phase shift of 45° and phase shifter 57 a positive phase shift of 135°, yielding a phase difference of 90°.

These and other modifications of the disclosed invention will be apparent to those skilled in the art. Accordingly, the invention should be limited only by the scope of the appended claims.

What is claimed is:

1. A system for communicating by means of radar beams, comprising, a Doppler radar set, a means to modulate the transmitted beam of said radar set, a remote station comprising a receiver adapted to pick up and demodulate said transmitted beam, said remote station further comprising a transmitter for picking up said transmitted radar beam, said transmitter comprising: means to impress amplitude modulation on said radar beam to produce a double sideband signal with no carrier, means to remove one of said sidebands from said signal, and means to reflect the remaining sideband back toward said radar set, the receiving circuitry of said radar set comprising means to demodulate said remaining sideband.

2. The system of claim 1 in which the transmitter of said remote station comprises; an antenna, a magic T, said antenna being connected to the parallel arm of said magic T, a pair of microwave phase shifters connected to the collinear arms of said magic T, said microwave phase shifters having phase shifts differing by 45 degrees, a length of shorted waveguide connected to the other ends of each of said microwave phase shifters, a diode mounted in each said waveguide 90 electrical degrees from the shorted end thereof, and means to apply modulating signals differing in phase by 90 degrees to each of said diodes.

3. The system of claim 2 wherein said transmitter of said remote station further comprises, a microphone and a high frequency emphasis circuit connected in cascade, means to apply the output of said high frequency emphasis circuit in parallel to a pair of audio phase shifters with a differential phase shift of 90 degrees, means to clip the output of each of said audio phase shifters, and means to apply the resulting clipped signals to a different one of said diodes as the modulating signals therefor.

4. The system of claim 1 wherein said transmitter of said remote station comprises; an antenna, a band stop filter connected to said antenna, a length of shorted waveguide connected to the other end of said filter, a diode mounted in said waveguide 90 electrical degrees from the shorted end thereof, means to apply an audio modulating signal to said diode, said filter being tuned to block one of the sidebands passing therethrough in the outgoing direction.

5. A system for communicating by means of radar beams, comprising, a Doppler radar set, means to modulate the transmitted beam thereof; a remote station station comprising, a transmitter for picking up said transmitted radar beam and impressing double sideband amplitude modulation with no carrier on said radar beam, and means for reflecting said modulated beam back toward said radar set; the receiving circuitry of said radar set comprising detection circuitry for responding to one of the sidebands received from said remote transmitter, and wherein said detection circuitry of said radar set comprises a pair of phase detectors, means to apply the incoming modulated echo signal to in parallel to said phase detectors, means to apply a sample of the transmitter output of said radar set to each of said phase detectors as a reference signal via two paths, means in each of said paths for differentially shifting said reference signals by 90 degrees, means connected to the outputs of each of said phase detectors for differentially shifting the phases the signals at the output thereof by 90 degrees, an adder connected to said last-named means, and a pair of headphones and a Doppler velocity indicator connected in parallel to the output of said adder.

6. A system for communicating by means of radar beams, comprising, a Doppler radar set, means to modulate the transmitted beam thereof; a remote station comprising, a transmitter for picking up said transmitted radar beam and impressing double sideband amplitude modulation with no carrier on said radar beam, and means for reflecting said modulated beam back toward said radar set; the receiving circuitry of said radar set comprising detection circuitry for responding to one of the sidebands received from said remote transmitter, and wherein said detection circuitry of said radar comprises, a circulator, a band stop filter connected to said circulator and a phase detector connected to the output of said band stop filter, said band stop filter having a stop band adapted to block one of the two sidebands received from said remote station.

References Cited

UNITED STATES PATENTS

| | | | |
|---|---|---|---|
| 3,067,417 | 12/1962 | Harding | 343—6.5 X |
| 3,310,802 | 3/1967 | Coleman et al. | 343—6.5 |
| 3,335,418 | 8/1967 | Earp et al. | 343—6 X |

RODNEY D. BENNETT, Jr., Primary Examiner

MALCOLM F. HUBLER, Assistant Examiner

U.S. Cl. X.R.

343—6